US008514241B2

(12) United States Patent
Baik et al.

(10) Patent No.: US 8,514,241 B2
(45) Date of Patent: Aug. 20, 2013

(54) METHOD AND APPARATUS FOR BIT RESOLUTION EXTENSION

(75) Inventors: Aron Baik, Yongin-si (KR); Chang-yeong Kim, Yongin-si (KR); Seong-deok Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1168 days.

(21) Appl. No.: 11/529,401

(22) Filed: Sep. 29, 2006

(65) Prior Publication Data

US 2007/0070084 A1   Mar. 29, 2007

(30) Foreign Application Priority Data

Sep. 29, 2005  (KR) .................. 10-2005-0091358

(51) Int. Cl.
*G09G 5/02*   (2006.01)
(52) U.S. Cl.
USPC .......................................... 345/605; 345/572
(58) Field of Classification Search
USPC .................................................. 345/605, 572
See application file for complete search history.

(56) References Cited

U.S. PATENT DOCUMENTS

| 4,941,190 | A | * | 7/1990 | Joyce | 382/264 |
| 5,029,226 | A | * | 7/1991 | Klein et al. | 382/275 |
| 5,109,436 | A | * | 4/1992 | Machida et al. | 382/270 |
| 5,787,208 | A |   | 7/1998 | Oh et al. |  |
| 6,144,700 | A | * | 11/2000 | Kim | 375/240.03 |
| 6,256,347 | B1 | * | 7/2001 | Yu et al. | 375/240.13 |
| 6,650,793 | B1 | * | 11/2003 | Lund et al. | 382/299 |
| 6,727,905 | B1 | * | 4/2004 | Narita | 345/574 |
| 7,016,548 | B2 | * | 3/2006 | Latva-Aho | 382/251 |
| 2005/0094877 | A1 | * | 5/2005 | Wang et al. | 382/199 |
| 2006/0257034 | A1 | * | 11/2006 | Gish et al. | 382/239 |

FOREIGN PATENT DOCUMENTS

| JP | 09-051421 A | 2/1997 |
| JP | 2002-057900 A | 2/2002 |
| KR | 10-2004-0094606 A | 11/2004 |

* cited by examiner

*Primary Examiner* — Maurice L McDowell, Jr
(74) *Attorney, Agent, or Firm* — Sughrue Mion, PLLC

(57) ABSTRACT

A bit-resolution-extension method is provided. The resolution extension method includes normalizing n-m upper bit values of adjacent pixels based on an upper n-m bit value of each pixel of a sample image, analyzing a statistical distribution of a lower m bit value of the reference pixel by patterns of a set consisting of the normalized adjacent pixels, generating a memory address from normalized adjacent pixel values of the sample image, saving a representative value of the lower m bits by patterns to the memory address as a result of the analysis, normalizing adjacent pixel values based on each pixel value of an input image, generating the memory address from the normalized adjacent pixel value of the input image, reading a representative value of the lower m bits saved in the memory address, and adding the read lower m bits to the input image pixel values as lower bits.

36 Claims, 8 Drawing Sheets

METHOD AND APPARATUS FOR BIT RESOLUTION EXTENSION

CROSS-REFERENCE TO RELATED APPLICATION

This application claims priority from Korean Patent Application No. 10-2005-0091358 filed on Sep. 29, 2005 in the Korean Intellectual Property Office, the disclosure of which is incorporated herein by reference in its entirety.

BACKGROUND OF THE INVENTION

1. Field of the Invention

Methods and apparatuses consistent with the present invention relate to extending bit resolution. More particularly, the present invention relates to a method and an apparatus for extending bit resolution by adding, to a pixel value of the input image, lower extension bits learned in advance according to values of adjacent pixels of each pixel of an input image.

2. Description of the Related Art

In the related art, lower bits of pixel values are discarded in the quantization process of image processing. As a result, the quality of an image is degraded or an artificial boundary of image components is generated, which is a related art problem.

To address the related art problem(s), studies for extending bit resolution are in progress, but it is difficult to apply these studies to small devices, such as mobile devices, because of the complexity of the calculation.

SUMMARY OF THE INVENTION

The present invention provides a method and an apparatus for extending bit resolution, which may improve the resolution of an image and may reduce quantization noise by extending bit resolution by adding lower bits learned in advance according to a pattern of values of adjacent pixels.

The present invention also provides a method and an apparatus for extending bit resolution without an increase in the number of calculations by reading and adding extension bit information corresponding to a pattern of values of adjacent pixels on each pixel of an input image while saving the extension bit information according the pattern of values of the adjacent pixels in memory.

According to an aspect of the present invention, there is provided a bit extension method including normalizing upper n-m bit values of adjacent pixels based on an upper n-m bit value of each pixel of a sample image, analyzing a statistical distribution of a lower m bit value of the reference pixel by patterns of a set consisting of the normalized adjacent pixels, generating a memory address from normalized adjacent pixel values of the sample image, saving a representative value of the lower m bits by patterns to the memory address as a result of the analysis, normalizing adjacent pixel values based on each pixel value of an input image, generating the memory address from the normalized adjacent pixel value of the input image, reading a representative value of the lower m bits saved in the memory address, and adding the read lower m bits to the input image pixel values as lower bits.

According to another aspect of the present invention, there is provided a bit extension device including a first means being inputted a sample image and an input image, a second means normalizing upper n-m bit values of adjacent pixels based on an upper n-m bit value of each pixel of a sample image and normalizing an adjacent pixel value based on each pixel value of the input image, a third means analyzing a statistical distribution of a lower m bit value of a reference pixel of a sample image by patterns of a set consisting of normalized adjacent pixel values of the sample image, a fourth means saving a representative value of lower m bits by patterns as a result of the statistical analysis according to the third means, a fifth means converting normalized adjacent pixel values of the sample image or normalized adjacent pixel values of the input image into an address of the fourth means, and a sixth means adding a representative value of lower m bits read from the address of the fourth means to a pixel value of the input image as a lower bit. Here, the representative value of lower m bits is saved in the address of the fourth means converted from normalized adjacent pixel values of the sample image.

BRIEF DESCRIPTION OF THE DRAWINGS

The above and other aspects of the present invention will become apparent by describing in detail exemplary embodiments thereof with reference to the attached drawings in which.

DETAILED DESCRIPTION OF EXEMPLARY EMBODIMENTS OF THE INVENTION

Figure 1:
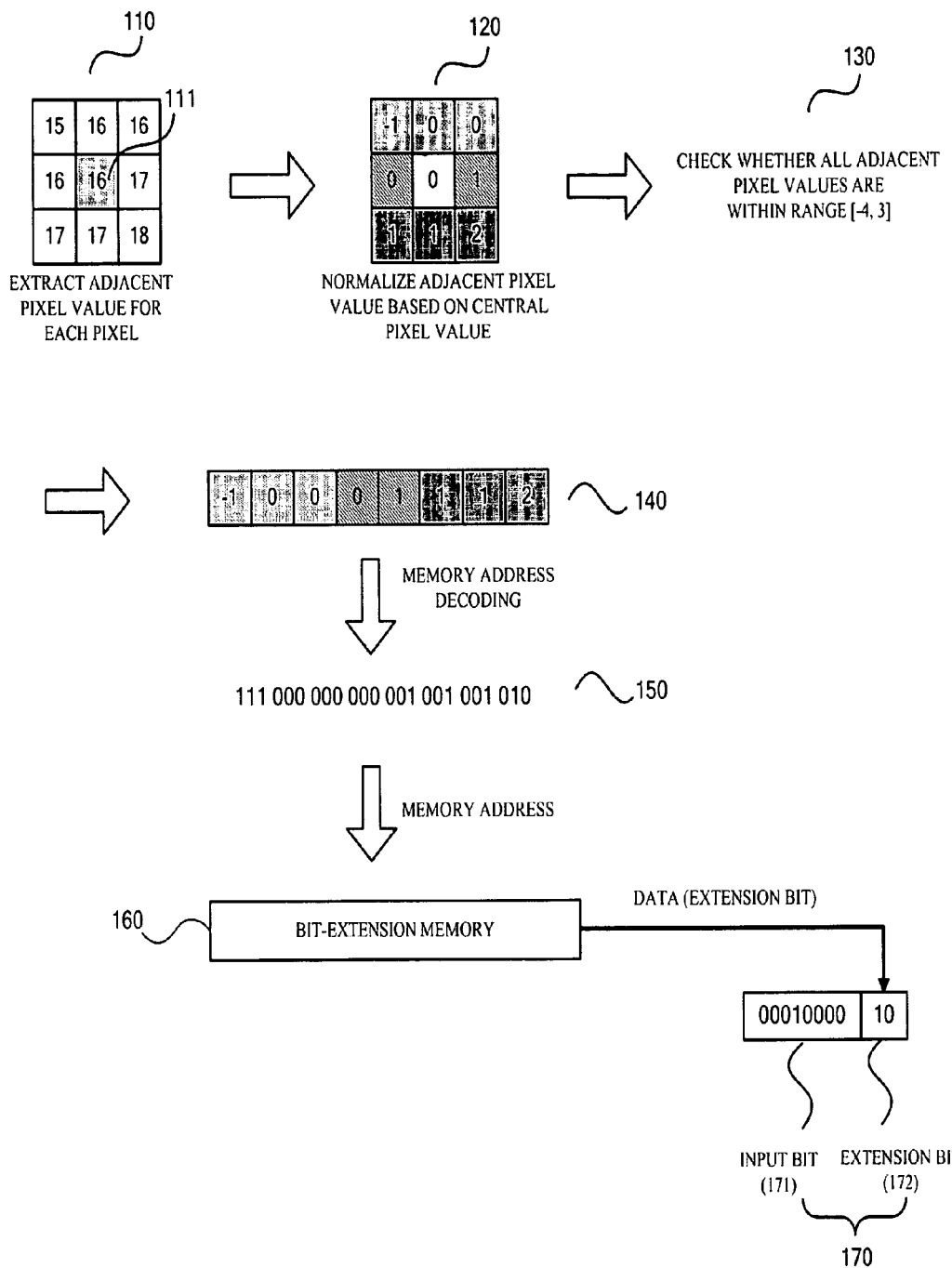
FIG. 1 is a schematic diagram illustrating a concept of a bit-resolution-extension method according to an exemplary embodiment of the present invention.

Exemplary embodiments of the present invention will be described in detail with reference to the accompanying drawings.

Various aspects and features of the exemplary embodiments of the present invention and methods of accomplishing the same may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

Hereinafter, exemplary embodiments of the present invention will be described in more detail with reference to the accompanying drawings. Each block and combinations of the blocks of the flow charts can be executed by computer program instructions. Because the computer program instructions can be executed in the processor of a general-purpose computer, special-purpose computer or other programmable data processing equipment, the instructions executed via the computers or other programmable data processing equipment generate means for executing the functions explained in the flow chart blocks. Because it is possible for the computer program instructions to be saved in computer-usable or computer-readable memories in order to implement functions in certain ways, the instructions saved in the computer-usable or computer-readable memories can produce items containing the instruction means for performing the functions explained in the flow chart blocks. The present invention may be embodied as a computer readable recording medium containing instructions for executing a program to perforin a method of bit-resolution-extension.

Also, each block can represent a part of a module, or a segment of code that includes one or more executable instructions for executing specific logical functions. Also, it should be noted that functions mentioned in the blocks can be executed out of order. For example, two sequential blocks can be executed at the same time, and the blocks can be executed in reverse order according to the concerned functions.

FIG. 1 is a schematic diagram illustrating a concept of a bit-resolution-extension method according to an exemplary embodiment of the present invention. The reference numerals represent either operations or structures.

Values of adjacent pixels surrounding a pixel are extracted 110 for each pixel of an input image, and adjacent pixel values are normalized 120 based on a pixel value 111 of a center. FIG. 1 illustrates normalization by differentiating a central pixel value from the central pixel value and adjacent pixel values. Checking 130 is performed to determine whether normalized values of adjacent pixels can be converted to a supported memory address. In the exemplary embodiment, because a normalized value of each adjacent pixel is binary-coded as 3 bits, checking determines whether the normalized value of each adjacent pixel is within a range that can be expressed by 3 bits, in other words, the range of [−4, 3]. A pixel value 170, whose bit resolution is extended, is generated by collecting 140 normalized values of adjacent pixels, decoding 150 the collected values as a 24-bit memory address, reading extension bit information 172 from an extension-bit information storage unit 160 where the extension bit information is saved in the memory address, and adding the information to a central pixel value 171 of an input image. In FIG. 1, the pixel value of 8-bit resolution is extended to 10 bits.

Figure 2:
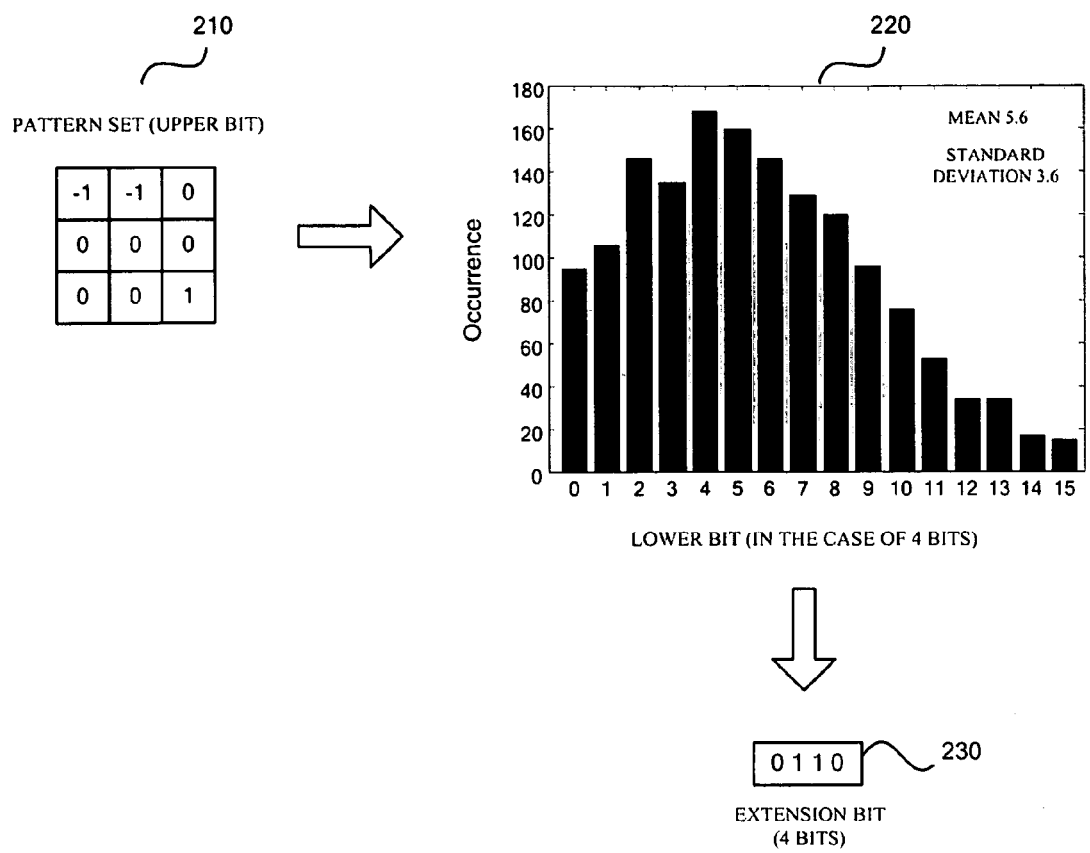
FIG. 2 illustrates a pattern set generation process for a bit-resolution-extension method according to an exemplary embodiment of the present invention.

When the same pattern as adjacent pixel values is included in a memory address generated from the adjacent pixel values, extension bit information for a central pixel is saved in the extension-bit information storage unit. FIG. 2 illustrates a process for generating extension bit information according to a pattern of values of adjacent pixels.

A generation of extension-bit information according to a pattern of values of adjacent pixels can be achieved by performing a training process after sample images are inputted. For example but not by way of limitation, one pattern set is generated 210 by extracting pixel sets consisting of 8 adjacent pixels centering on one pixel of the sample image, and normalizing values of adjacent pixels centering on the central pixel value as described in FIG. 1. When adjacent pixel values have these pattern set values, extension-bit information is generated by considering values statistically having substantially high probabilities as lower bits. The detailed explanation is as follows.

All pixel values of sample images are values generated as n-m bits after cutting lower m bits from n-bit pixel values. The pattern set of FIG. 2 becomes −1, −1, 0, 0, 0, 0, 0, 1 when adjacent pixels are read in order from the upper left side to the lower right side. If a pattern of normalized values of adjacent pixels calculated by upper n-m bits from pixel information of a plurality of sample images is −1, −1, 0, 0, 0, 0, 0, 1, a distribution of lower m bits, which pixel values of original sample images have, is analyzed and the mean is calculated. In FIG. 2, a distribution of lower m bits of the central pixel, in which the pattern of adjacent pixels is −1, −1, 0, 0, 0, 0, 0, 1, is illustrated at reference character 220, and the mean is about 5.6. If m is 4, the lower bit, an extension bit, will be "0110" which is close to about 5.6.

In other words, the bit-resolution-extension method according to the exemplary embodiment receives sample images, cuts lower m bits of each pixel value of the sample images, and converts them to images of a bit depth which is expressed as the remaining upper n-m bits. Statistical representative values such as means, modes, medians and others are registered in a memory as extension-bit values by examining patterns of normalized values of adjacent pixels and by analyzing the distributions of the lower m bits.

Figure 3:
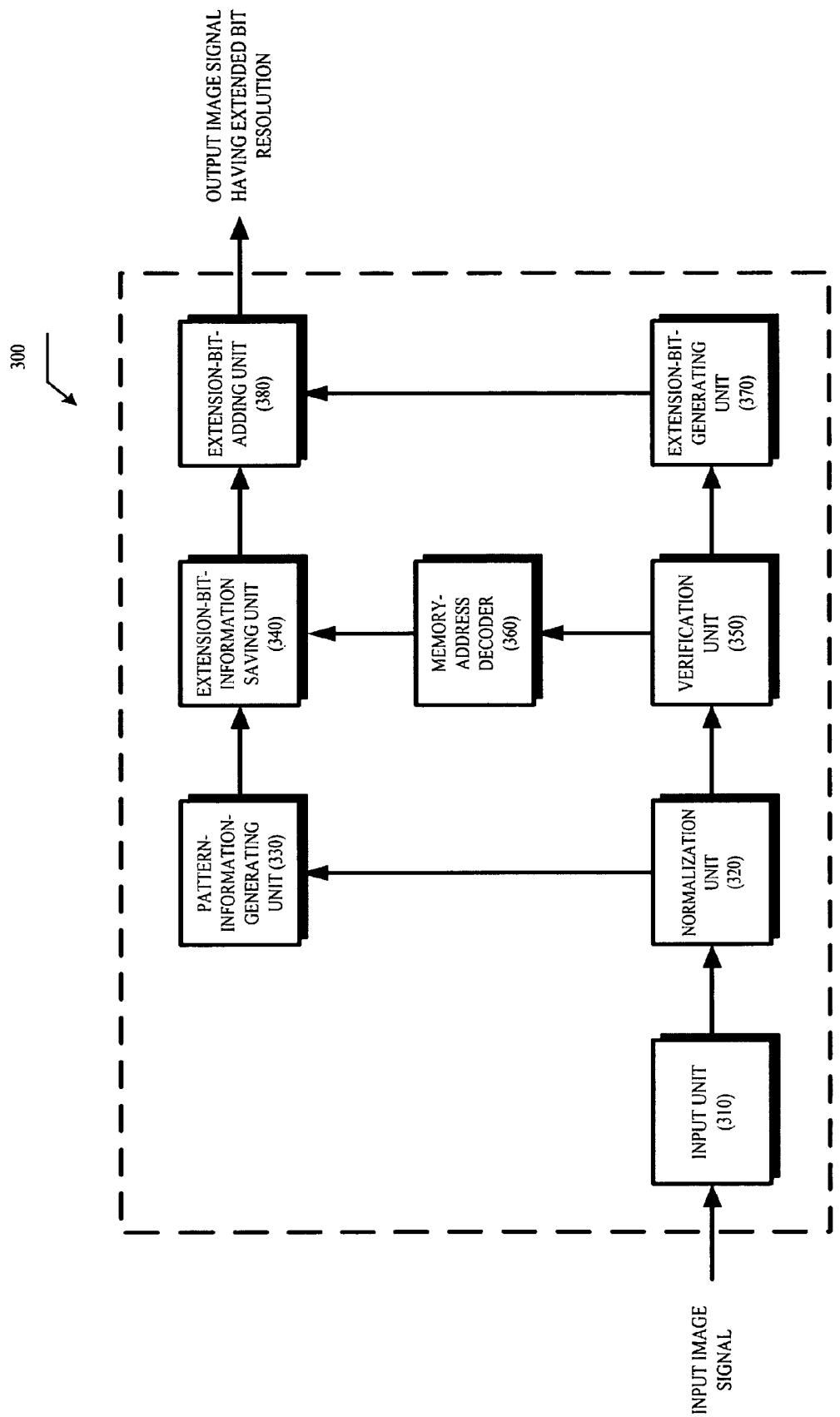
FIG. 3 is a block diagram illustrating the structure of a bit-resolution-extension device according to an exemplary embodiment of the present invention.

FIG. 3 is a block diagram illustrating the structure of a bit-resolution-extension device according to an exemplary embodiment of the present invention. The bit-resolution-extension device includes an input unit 310, a normalization unit 320, a pattern-information-generating unit 330, an extension-bit information storage (or saving) unit 340, a verification unit 350, a memory-address decoder 360, an extension-bit-generating unit 370 and an extension-bit-adding unit 380.

An image signal is input into the input unit 310, which transmits the signal to the normalization unit 320. The inputted image can be a sample image for generating extension bit information or an input image for extending bit resolution. However, the present invention is not limited thereto, and other images may be input as would be understood by one skilled in the art.

The normalization unit 320 normalizes pixels values of all pixel sets consisting of one central pixel of the image and 8 adjacent pixels adjacent to the central pixel, based on the central pixel value. According to an exemplary embodiment of the normalization method, values of the central pixel are differentiated from values of 9 pixels within the set.

When normalizing a sample image after being transmitted the sample image, lower m bits are cut from n-bit pixel values of a pixel set, a normalization process is executed only with upper n-m bits, and the result is transferred to a pattern information-generating unit 330. After executing normalization for an input image whose bit resolution is to be extended, the result is transmitted to the verification unit 350.

The verification unit 350 verifies whether values of normalized adjacent pixels are within a value range that can be decoded as a memory address. If values of the normalized adjacent pixels overflow a supportable memory address, the verification unit 350 can be omitted in case of the exemplary embodiment that generates a memory address only with supportable lower bits regardless of the overflow.

As a result of verification of the verification unit 350, if values of normalized adjacent pixels are within a value range that can be decoded as a memory address, the memory address decoder 360 converts values of adjacent pixels into memory addresses. An exemplary embodiment of a method of converting values of adjacent pixels into memory addresses includes a method binary-coding according to the number of supportable bits. For example, if each normalized value of 8 adjacent pixels is binary-coded as 3 bits, respectively, a memory address of a total 24-bit length is generated.

The bit-resolution-extension device 300 extracts extension bit information saved in the extension-bit-information storage unit 340 with a memory address generated by the memory address decoder 360, and transmits the extracted information to the extension bit-adding unit 380.

Meanwhile, as a result of verification of the verification unit 350, if values of normalized adjacent pixels are not within the range that can be decoded with as a memory address, the extension bit-generating unit 370 generates a random value as an extension bit and transmits a constant value to an extension bit-adding unit 380.

The extension bit-adding unit 380 outputs an image signal whose bit depth is extended by adding the received extension bit to a value of an input image pixel as a lower-order bit.

The pattern information-generating unit 330 receives pattern sets of normalized adjacent pixels of a plurality of sample images as described in FIG. 2, analyzes a statistical distribution of lower bits cut by patterns, selects representative values, and saves the values in the extension-bit-information storage unit 340.

Each element in FIG. 3 can refer to a software element or a hardware element such as an field programmable gate array (FPGA) or an application specific integrated circuit (ASIC). However, the elements are not limited to software or hardware. The elements can reside in an addressable storage media or can reproduce one or more processors. The functions provided in the elements can be implemented by further-divided elements, or can be implemented to execute certain functions by combining plural elements. Furthermore, the elements can be implemented to execute one or more computers within a system.

Figure 4:
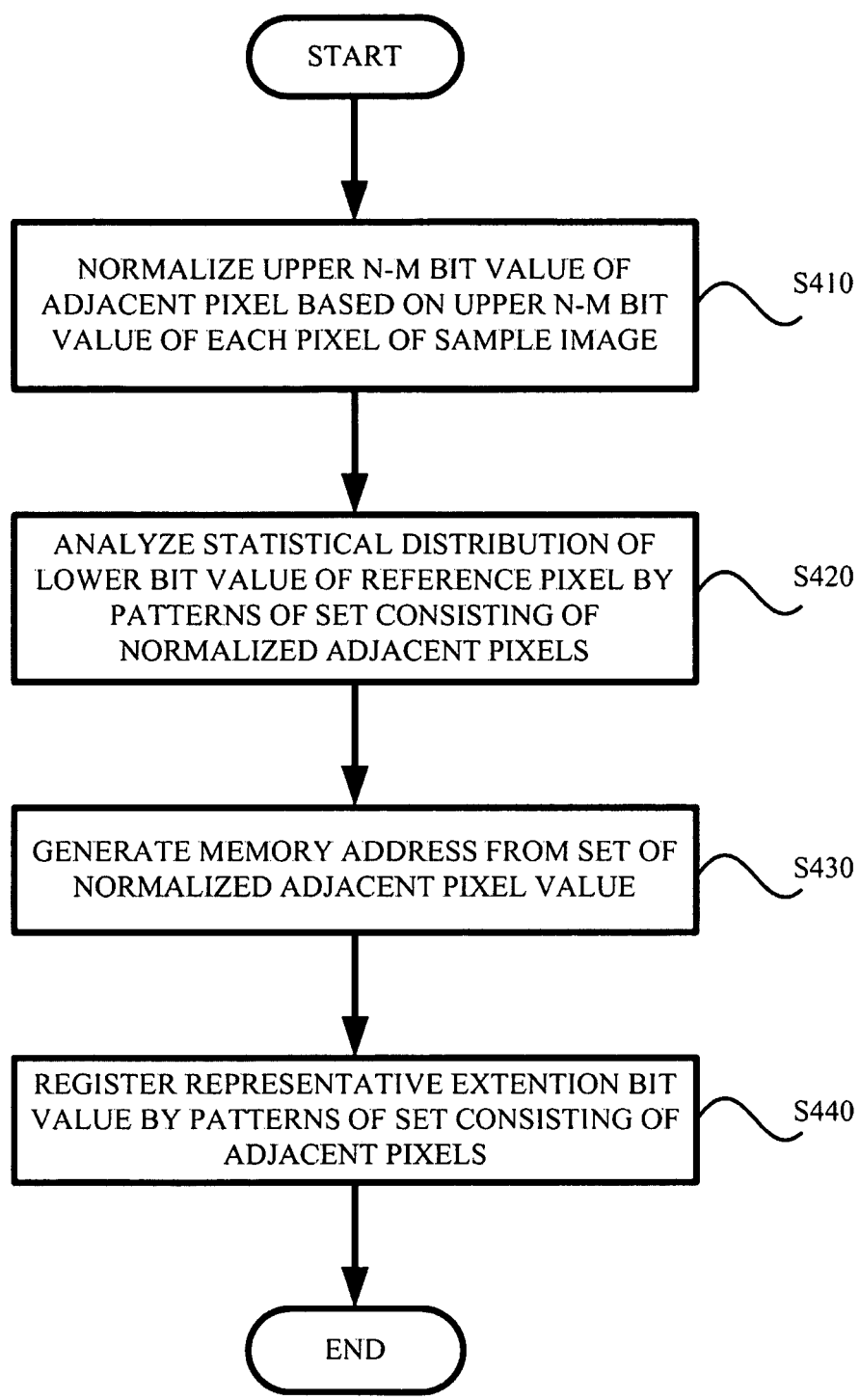
FIG. 4 is a flow chart illustrating a pattern set generation process for a bit-resolution-extension method according to an exemplary embodiment of the present invention.

FIG. 4 is a flow chart illustrating a pattern set generation process for a bit-resolution-extension method according to an exemplary embodiment of the present invention. The bit-resolution-extension device 300 receives a plurality of sample images and passes through a training process. The values lower bits of a central pixel (a reference pixel) are analyzed according to a pattern of adjacent pixels surrounding one pixel in the training process, a representative value is selected, and the selected value is saved in a memory.

The detailed explanation is as follows. While the disclosure indicates a plurality of bit values, the explanation may also apply to a single bit value.

The bit-resolution-extension device 300 cuts lower m bits from a value of each pixel of n-bit length of a sample image, and executes a training process with a pixel value consisting of remaining upper n-m bits. The normalization unit 320 normalizes S410 upper n-m bit values of adjacent pixels surrounding a reference pixel, based on upper n-m bit values.

The pattern information-generation unit 330 analyzes a distribution of cut lower bit values of a reference pixel for each pattern of pixel sets consisting of normalized adjacent pixel values, and selects S420 lower bit values representing each pattern. Lower bit values that represent each pattern can be means, modes, medians and others as would be understood by one skilled in the art.

The extension-bit-information storage unit 340 saves S440 lower bit values by patterns to a memory address generated S430 from normalized adjacent pixel values of a sample image by a memory address decoder 360 as extension bit values, and in case of images inputted after this, bits are extended according to saved extension-bit values.

Figure 5:
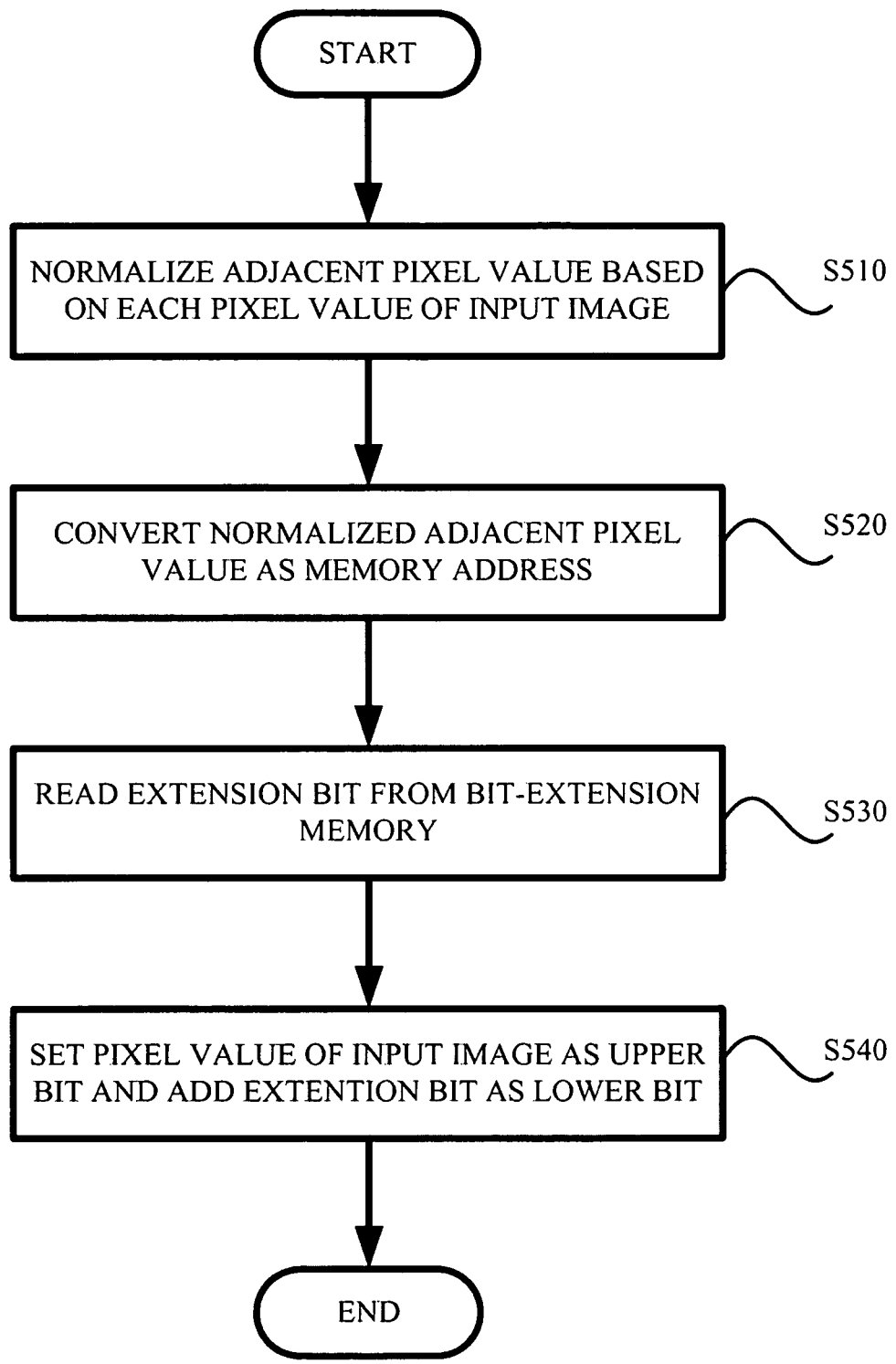
FIG. 5 is a flow chart illustrating a process of a bit-resolution-extension method according to a first exemplary embodiment of the present invention.

FIG. 5 is a flow chart illustrating a process of a bit-resolution-extension method according to a first exemplary embodiment of the present invention. The normalization unit 320 of the bit-resolution-extension device 300 normalizes adjacent pixel values surrounding pixels (S510), based on each pixel value of an input image, and converts normalized adjacent pixel values whose memory address decoder 360 is normalized (S520). At this time, if there is an overflow, upper bits are disregarded, and a memory address is generated by lower bits corresponding to a length that is supported. The extension bit-adding unit 380 reads extension bit information saved in a memory address from the extension-bit-information storage unit 340 (S530), and outputs an image signal whose bit depth is extended by adding an extension bit to a pixel value of an input image as a lower bit (S540).

Figure 6:
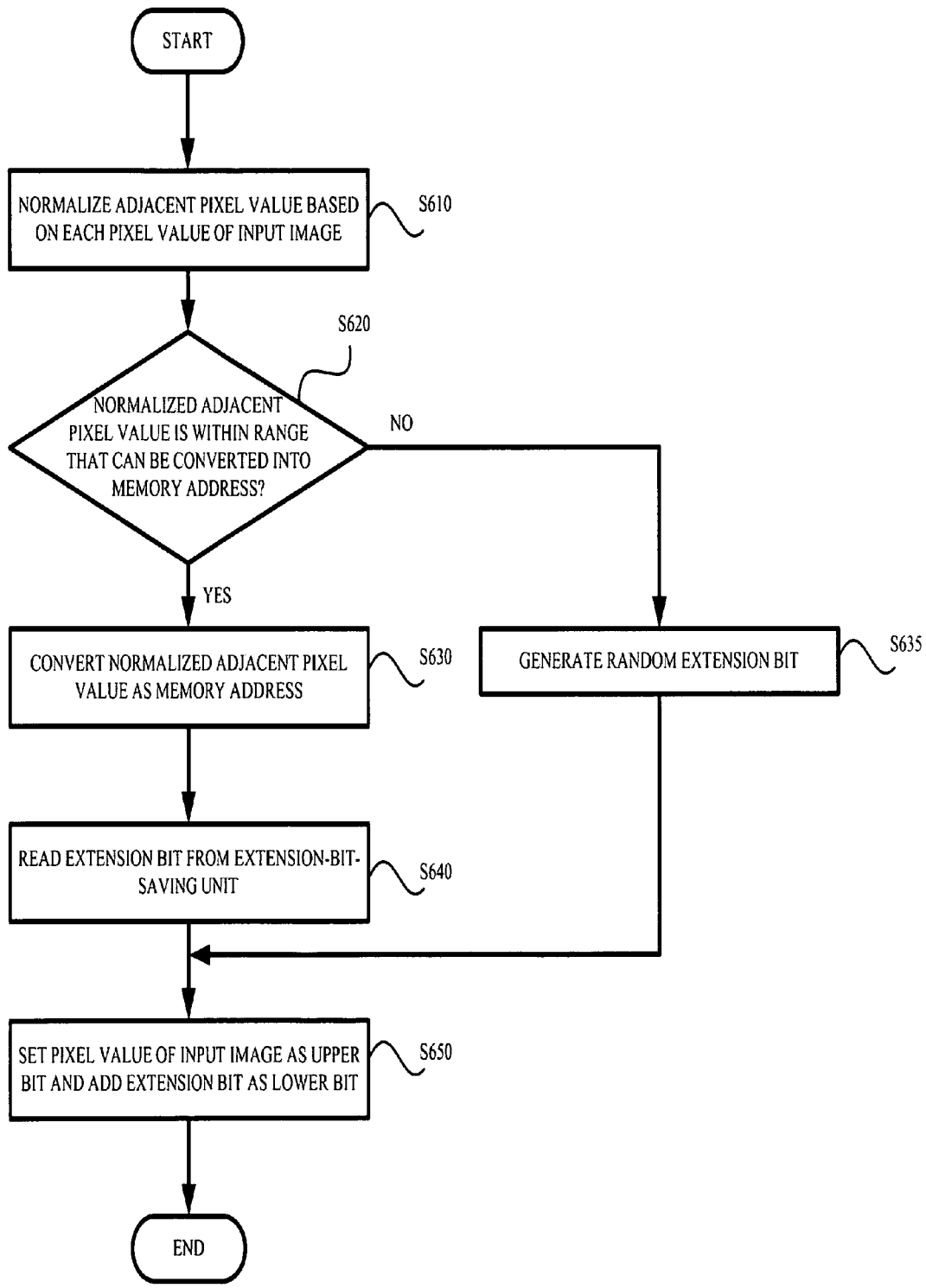
FIG. 6 is a flow chart illustrating a process of a bit-resolution-extension method according to a second exemplary embodiment of the present invention.

FIG. 6 is a flow chart illustrating a process of a bit-resolution-extension method according to a second exemplary embodiment of the present invention. The normalization unit 320 of the bit-resolution-extension device 300 normalizes adjacent pixel values, based on each pixel value of an input image (S610), and the verification unit 350 determines whether normalized adjacent pixel values are within a range that can be converted into a supportable memory address (S620).

As a result of the verification, if the normalized adjacent pixel values are within the range that can be converted into a memory address (Yes in S620), the memory address decoder 360 converts the normalized adjacent pixel values into a memory address (S630), and reads extension bit information from the extension-bit-information storage unit 340 with this address (S640).

On the other hand, if the normalized adjacent pixel values are not within the range that can be converted into a memory address (No in S620), the extension bit-generating unit 370 generates an extension bit as a random value or allots a constant value (S635).

The extension bit-adding unit 380 adds an extension bit value read from the extension-bit-information storage unit 340 or an extension bit value generated by the extension bit-generating unit 370 to a pixel value of an input image as a lower bit (S650).

Figure 7:
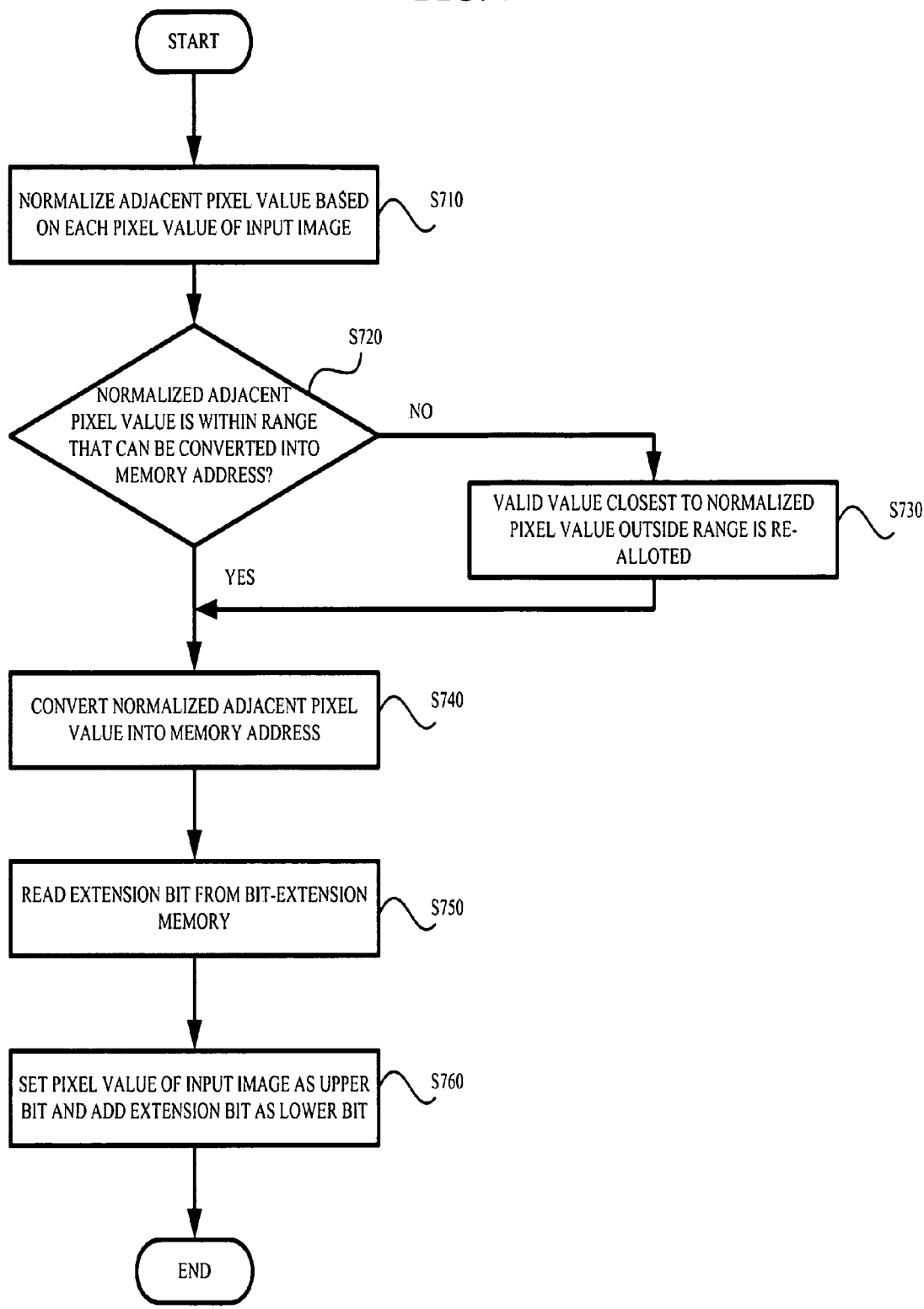
FIG. 7 is a flow chart illustrating a process of a bit-resolution-extension method according to a third exemplary embodiment of the present invention.

FIG. 7 is a flow chart illustrating a process of a bit-resolution-extension method according to a third exemplary embodiment of the present invention. The normalization unit 320 of the bit-resolution-extension device 300 normalizes an adjacent pixel value, based on each pixel value of an input image, and the verification unit 350 determines whether the normalized adjacent pixel value is within a range that can be converted into a supportable memory address (S720).

As a result of the verification, if the adjacent pixel value is within a range that can be converted into a memory address (Yes in S720), the memory address decoder 360 converts the normalized adjacent pixel value into a memory address (S740), and reads extension bit information from the extension-bit-information storage unit 340 with this address (S750).

On the other hand, if the normalized adjacent pixel value is not within a range that can be converted into a memory address (No in S720), the normalization unit 320 resets the adjacent pixel value as a closest valid value (S730).

The extension bit-adding unit 380 adds an extension bit value read from the extension-bit-information storage unit 340 or an extension bit value reset by the extension bit-generating unit 370 to a pixel value of an input image as a lower bit (S760).

Figure 8:
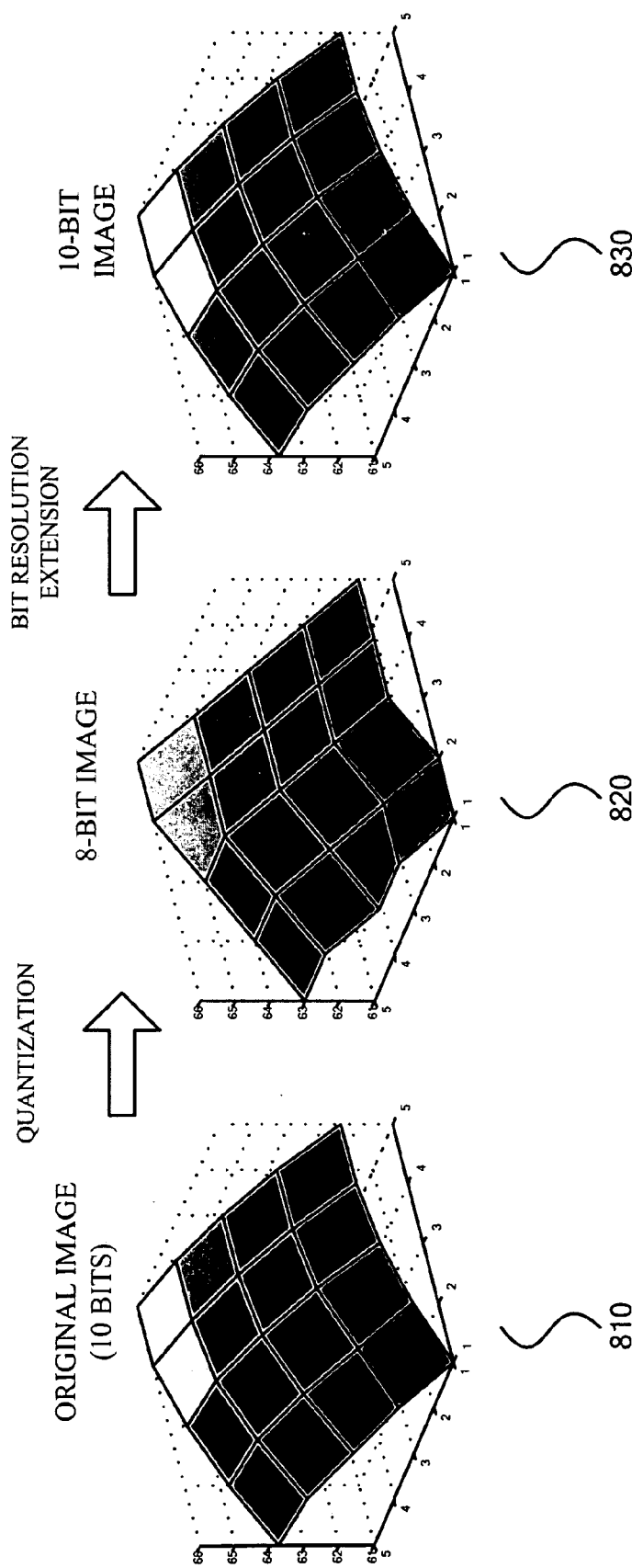
FIG. 8 illustrates an effect of a bit-resolution-extension method according to an exemplary embodiment of the present invention.

FIG. 8 illustrates an effect of a bit-resolution-extension method according to an exemplary embodiment of the present invention. As a surface of an original image having 10-bit resolution as expressed in 810 passes through a quantization process, the bit resolution is reduced to 8 bits, then the image is distorted as shown at reference character 820. If the resolution is extended to 10 bits again by the bit-resolution-extension method according to the exemplary embodiment, an image of substantially improved quality may be acquired as shown at reference character 830. However, the exemplary embodiments do not require any quality comparison or improvement.

It should be understood by those of ordinary skill in the art that various replacements, modifications and changes may be made in the form and details without departing from the spirit and scope of the present invention as defined by the following claims. Therefore, it is to be appreciated that the above described exemplary embodiments are for purposes of illustration only and are not to be construed as limitations of the invention.

The method and the apparatus for extending bit resolution according to the exemplary embodiments may produce the following effects. However, these effects are not necessary for one skilled in the art to practice the exemplary embodiments, and other effects may also be realized, or no effects may be realized without departing from the scope of the invention.

First, the resolution of an image may be improved and quantization noise may be reduced by extending the bit resolution by adding lower bits learned in advance according to a pattern of values of adjacent pixels.

Second, the bit resolution may be extended without an increase in the amount of calculation by reading and adding extension-bit information corresponding to a pattern of values of adjacent pixels to each pixel of an input image while saving the extension-bit information according to the pattern of values of the adjacent pixels in memory.

What is claimed is:

1. A bit-resolution-extension method performed by a bit-resolution-extension device, the method comprising:
   normalizing, by the bit-resolution-extension device, upper n-m bit values of adjacent pixels based on an upper n-m bit value of a reference pixel for each pixel of a sample image by differentiating the upper n-m bit value of the reference pixel of the sample image from the upper n-m bit values of the adjacent pixels of the sample image;
   analyzing a statistical distribution of a lower m bit value of the reference pixel by patterns of a set comprising the normalized adjacent pixels;
   generating a memory address from normalized adjacent pixel values of the sample image;
   saving a representative value of the lower m bits by patterns to the memory address generated as a result of the analyzing;
   normalizing adjacent pixel values based on a reference pixel value for each pixel of an input image by differentiating the reference pixel value of the input image from the adjacent pixel values of the input image;
   generating the memory address from the normalized adjacent pixel values of the input image;
   reading the representative value of the lower m bits saved in the memory address; and
   adding the read lower m bits to the input image pixel values as lower bits.

2. The method of claim 1, wherein the representative value of the lower m bits by the patterns is an arithmetic mean of the lower m bits by the patterns.

3. The method of claim 1, wherein the representative value of the lower m bits by the patterns is a mode of the lower m bits by the patterns.

4. The method of claim 1, wherein the representative value of the lower m bits by the patterns is a median of the lower m bits by the patterns.

5. The method of claim 1, wherein the generating the memory address from the normalized adjacent pixel values of the sample image comprises:
   binary-coding the normalized adjacent pixel values of the sample image.

6. The method of claim 1, wherein the generating the memory address from the normalized adjacent pixels values of the input image comprises:
   binary-coding the normalized adjacent pixel values.

7. The method of claim 1, further comprising:
   determining whether the normalized adjacent pixel values of the input image are within a range that can be converted into the memory address,
   wherein if it is determined that the normalized adjacent pixel values are within the range, the normalized adjacent pixel values are converted into the memory address, and if the normalized adjacent pixel values of the input image are not within the range, random m bits are generated.

8. The method of claim 1, further comprising:
   determining whether the normalized adjacent pixel values of the input image are within a range that can be converted into the memory address,
   wherein if it is determined that the normalized adjacent pixel values are within the range, the normalized adjacent pixel values are converted into the memory address, and if the normalized adjacent pixel values of the input image are not within the range, predetermined m bits are added to the pixel values of the input image as lower bits.

9. The method of claim 1, further comprising:
   determining whether the normalized adjacent pixel values of the input image are within a range that can be converted into the memory address,
   wherein if it is determined that the normalized adjacent pixel values are within the range, the values are converted into the memory address, and if the normalized adjacent pixel values of the input image are not within the range, a value closest to the normalized adjacent pixel values within the range is allotted again.

10. A bit-resolution-extension method performed by a bit-resolution extension device, the method comprising:
    normalizing, by the bit-resolution-extension device, an adjacent pixel value based on a reference pixel value for each pixel of an input image by differentiating the reference pixel value of the input image from the adjacent pixel value of the input image;
    generating a memory address from the normalized adjacent pixel value of the input image;
    reading a representative value of lower m bits saved in the memory address; and
    adding the read lower m bits to the input image pixel value as lower bits.

11. The method of claim 10, wherein the generating the memory address comprises:
    binary-coding the normalized adjacent pixel value.

12. The method of claim 10, further comprising:
    determining whether the normalized adjacent pixel value of the input image is within a range that can be converted into the memory address,
    wherein if it is determined that the normalized adjacent pixel value is within the range, the value is converted into the memory address, and if the normalized adjacent pixel value of the input image is not within the range, m random bits are generated.

13. The method of claim 10, further comprising:
determining whether the normalized adjacent pixel value of the input image is within a range that can be converted into the memory address,
wherein if it is determined that the normalized adjacent pixel value is within the range, the value is converted into the memory address, and if the normalized adjacent pixel value of the input image is not within the range, m predetermined bits are added to the pixel value of the input image as lower bits.

14. The method of claim 10, further comprising:
determining whether the normalized adjacent pixel value of the input image is within a range that can be converted into the memory address,
wherein if it is determined that the normalized adjacent pixel value is within the range, the value is converted into the memory address, and if the normalized adjacent pixel value of the input image is not within the range, a value closest to the normalized adjacent pixel value within the range is allotted again.

15. A bit-resolution-extension device comprising:
a first means for receiving a sample image and an input image;
a second means for normalizing n-m upper bit values of adjacent pixels based on a n-m upper bit value of a reference pixel for each pixel of the sample image by differentiating the upper n-m bit value of the reference pixel of the sample image from the upper n-m bit values of the adjacent pixels of the sample image, and normalizing adjacent pixel values based on a reference pixel value for each pixel of the input image by differentiating the reference pixel value of the input image from the adjacent pixel values of the input image;
a third means for analyzing a statistical distribution of lower m bit values of the reference pixel by patterns of a set comprising normalized adjacent pixels of the sample image;
a fourth means for saving a representative value of the lower m bits by patterns as a result of a statistical analysis according to the third means;
a fifth means for converting the normalized adjacent pixel values of the sample image or the normalized adjacent pixel values of the input image into an address of the fourth means; and
a sixth means for adding the lower m-bit representative values read from the address of the fourth means to a pixel value of the input image as lower bits,
wherein the lower m-bit representative values are saved in the address of the fourth means converted from the normalized adjacent pixel values of the sample image.

16. The device of claim 15, wherein the representative value of the lower m bits by the patterns is an arithmetic mean of the lower m bits by the patterns.

17. The device of claim 15, wherein the representative value of the lower m bits by the patterns is a mode of the lower m bits by the patterns.

18. The device of claim 15, wherein the representative value of the lower m bits by the patterns is a median of the lower m bits by the patterns.

19. The device of claim 15, wherein the fifth means binary-codes the normalized adjacent pixel values.

20. The device of claim 15, further comprising:
a seventh means for determining whether the normalized adjacent pixel values of the input image are within a range that can be converted into an address of the fourth means,
wherein if it is determined that the normalized adjacent pixel values are within the range, the fifth means converts the normalized adjacent pixel values of the input image into the address of the fourth means.

21. The device of claim 20, wherein if the normalized adjacent pixel values of the input image are not within the range, an eighth means for generating m random bits is used.

22. The device of claim 15, further comprising:
a seventh means for determining whether the normalized adjacent pixel values of the input image are within a range that can be converted into the memory address,
wherein if it is determined that the normalized adjacent pixel values are within the range, the fifth means converts the normalized adjacent pixel values of the input image into the address of the fourth means.

23. The device of claim 22, wherein if the normalized adjacent pixel values of the input image are not within the range, a eighth means for generating m predetermined bits is used.

24. The device of claim 15, further comprising:
a seventh means for determining whether the normalized adjacent pixel values of the input image are within a range that can be converted into the memory address,
wherein if it is determined that the normalized adjacent pixel values are within the range, the fifth means converts the normalized adjacent pixel values of the input image into the address of the fourth means, and if the normalized adjacent pixel values of the input image are not within the range, the seventh means allots a value closest to the normalized adjacent pixel values within the range again.

25. A bit-resolution-extension device, comprising:
a first means for inputting an input image;
a second means for normalizing an adjacent pixel value based on a reference pixel value for each pixel of the input image by differentiating the reference pixel value of the input image from the adjacent pixel value of the input image;
a third means for converting the normalized adjacent pixel value of the input image into a memory address; and
a fourth means for adding a representative value of the lower m bits read from the memory address to the pixel value of the input image as a lower bit.

26. The device of claim 25, wherein the third means binary-codes a value of the normalized adjacent pixel.

27. The device of claim 25, further comprising:
a fifth means for determining whether the normalized adjacent pixel value of the input image is within a range that can be converted into the memory address,
wherein if it is determined that the normalized adjacent pixel value is within the range, the third means converts the normalized adjacent pixel value of the input image into the memory address.

28. The device of claim 27, wherein if the normalized adjacent pixel value of the input image is not within the range, a sixth means for generating m random bits is used.

29. The device of claim 25, further comprising:
a fifth means for determining whether the normalized adjacent pixel value of the input image is within a range that can be converted into the memory address, wherein if it is determined that the normalized adjacent pixel value is within the range, the third means converts the normalized adjacent pixel value of the input image into the memory address.

30. The device of claim 29, wherein if the normalized adjacent pixel value of the input image is not within the range, a sixth means for generating m predetermined bits is used.

31. The device of claim 25, further comprising:
a fifth means for determining whether the normalized adjacent pixel value of the input image is within a range that can be converted into the memory address,
wherein if it is determined that the normalized adjacent pixel value is within the range, the third means converts the normalized adjacent pixel value of the input image into the memory address, and if the normalized adjacent pixel value of the input image is not within the range, the fifth means allots a values closest to the normalized adjacent pixel value of the input image within the range again.

32. A non-transitory computer readable recording medium containing instructions for executing a program to perform a method of bit-resolution-extension, the method comprising:
normalizing upper n-m bit values of adjacent pixels based on an upper n-m bit value of a reference pixel for each pixel of a sample image by differentiating the upper n-m bit value of the reference pixel of the sample image from the upper n-m bit values of the adjacent pixels of the sample image;
analyzing a statistical distribution of a lower m bit value of the reference pixel by patterns of a set comprising the normalized adjacent pixels;
generating a memory address from normalized adjacent pixel values of the sample image;
saving a representative value of the lower m bits by patterns to the memory address generated as a result of the analysis;
normalizing adjacent pixel values based on a reference pixel value for each pixel of an input image by differentiating the reference pixel value of the input image from the adjacent pixel values of the input image;
generating the memory address from the normalized adjacent pixel values of the input image;
reading the representative value of the lower m bits saved in the memory address; and
adding the read lower m bits to the input image pixel values as lower bits.

33. The non-transitory computer readable recording medium of claim 32, wherein the representative value of the lower m bits by the patterns is an arithmetic mean of the lower m bits by the patterns.

34. The non-transitory computer readable recording medium of claim 32, wherein the representative value of the lower m bits by the patterns is a mode of the lower m bits by the patterns.

35. The non-transitory computer readable recording medium of claim 32, wherein the representative value of the lower m bits by the patterns is a median of the lower m bits by the patterns.

36. The non-transitory computer readable recording medium of claim 32, wherein the generating the memory address from the normalized adjacent pixel values of the sample image comprises:
binary-coding the normalized adjacent pixel values of the sample image.

* * * * *